United States Patent [19]

Barthruff

[11] 4,237,742
[45] Dec. 9, 1980

[54] ELECTRICALLY CONTROLLABLE SETTING DEVICE

[75] Inventor: Otto Barthruff, Stuttgart, Fed. Rep. of Germany

[73] Assignee: Robert Bosch GmbH, Stuttgart, Fed. Rep. of Germany

[21] Appl. No.: 865,624

[22] Filed: Dec. 29, 1977

[30] Foreign Application Priority Data

Jun. 2, 1977 [DE] Fed. Rep. of Germany ....... 2724828

[51] Int. Cl.³ ...................... F16H 27/02; F02D 11/10; B60K 27/00
[52] U.S. Cl. ................................. 74/89.19; 180/178; 123/350
[58] Field of Search ................... 180/105 R, 108, 110; 123/102; 74/89.19

[56] References Cited

U.S. PATENT DOCUMENTS 3,392,799 7/1968 Ishikawa .............................. 123/102
3,727,714 4/1973 Ishikawa .............................. 180/108

Primary Examiner—Carroll B. Dority, Jr.
Assistant Examiner—Wesley S. Ratliff, Jr.
Attorney, Agent, or Firm—Michael J. Striker

[57] ABSTRACT

An adjusting device for controlling the position of a gas lever in a motor vehicle in cooperation with a speed controlling servo-mechanism arranged in the vehicle for delivering a control signal, comprises an electromotor energized by the control signal, a shaft supported on a support for rotation about its axis and for movement along its axis, an electromagnetic coupling having a disc-shaped armature rotatably supported on the shaft and an electromagnetic member fixedly connected to the shaft. The electromagnetic member of the coupling is energized by the control signal to engage with the armature. A first reduction gear is arranged between the electromotor and the armature. A locking arm is pivotably supported on the support and linked at its free end to the gas lever and, at its other end, to the second reduction gear.

10 Claims, 2 Drawing Figures

ELECTRICALLY CONTROLLABLE SETTING DEVICE

BACKGROUND OF THE INVENTION

This invention relates generally to a setting device for a servo-mechanism and more particularly, it relates to an electrically controllable setting device for adjusting the position of a gas pedal in a motor vehicle in response to a control signal delivered by a servo-mechanism arranged in the vehicle.

Prior art setting devices of this type have included an electromotor connected to an electromagnetic coupling via a worm gear. This arrangement, however, has proved to be insufficient to transform the rotary movement of the electromotor into a regulating force capable of displacing the gas pedal over an increased range of its travel.

The primary object of this invention is therefore to provide an electrically actuated setting device that can produce an increased regulating force and thus increase the range of regulating movement of the control mechanism.

Another object of this invention is to provide a setting device suitable for mass production.

Still another object of this invention is to provide a setting device that could be employed in existing speed controlling servo-mechanisms in motor vehicles.

Furthermore, an object of this invention is to provide a setting device that is capable of resuming instantly its non-regulating of zero position.

SUMMARY OF THE INVENTION

According to the present invention, the above objects are attained by providing a shaft rotatable on a support and also displaceable along its axis about a short distance. The armature of the magnetic coupling is rotatably supported on the shaft and coupled to the driving electromotor via a first reduction gear. The electromagnetic part of the coupling is secured at one end of the shaft and normally is held out of engagement with the armature by means of a tension spring. The electromagnet of the magnetic part of the coupling is energized simultaneously with the actuation of the driving motor by a control signal from speed controlling servo-mechanisms; upon energization, the magnetic part engages the armature and rotates the shaft. The other end of the shaft is coupled via a second reduction gear with a rocking arm that is normally spring biased to a rest position and linked to the gas lever of the vehicle. Due to the second reduction gear, the range and magnitude of the regulating force is considerably increased. The actual position of the shaft is indicated by a potentiometer that delivers an actual value signal to the servo-mechanism.

Due to the spring bias by means of a return spring, the rocking arm returns instantly to its rest position as soon as the electromagnetic coupling is deenergized by a command signal. This situation can occur for instance when the driver of the motor vehicle actuates the coupling pedal prior to the actuation of the gear shift lever. During the sudden removal of the load the rotational speed of the car engine would substantially increase and the rotational speed might attain undue values. To avoid this excessive speed the gas pedal has to be immediately released.

The novel features which are considered as characteristic for the invention are set forth in particular in the appended claims. The invention itself, however, both as to its construction and its method of operation together with additional objects and advantages thereof, will be best understood from the following description of a specific embodiment when read in connection with the accompanying drawings.

DESCRIPTION OF THE PREFERRED EMBODIMENT

Figure 1:
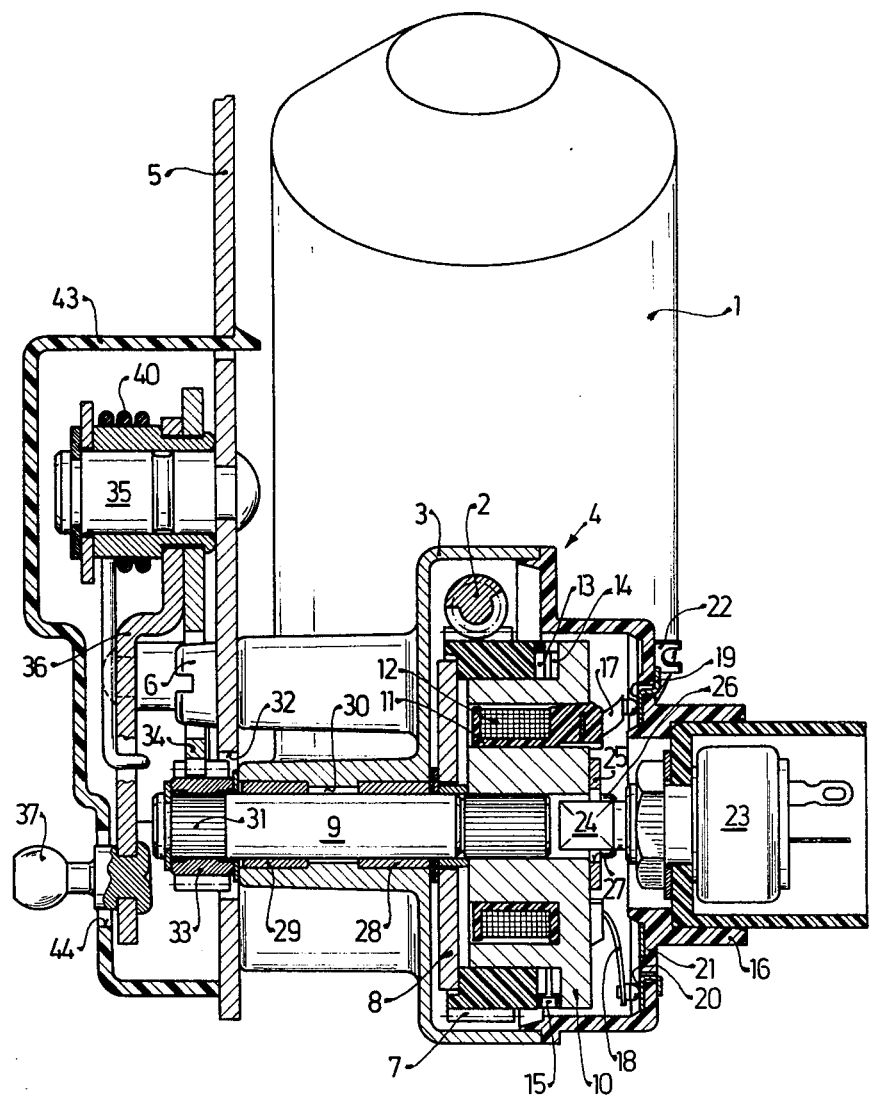
FIG. 1 is a sectional side view of the setting device of this invention.

The example of the electrically controllable setting device illustrated in the drawing is designed for use in connection with a servo-mechanism arranged in the vehicle for maintaining constant driving speed whereby the setting device of this invention controls the position of the gas lever of the combustion engine in response to an output signal of the servo-mechanism controlling the driving speed by comparing the actual driving speed of the vehicle with a set nominal value. In this manner, the setting device in cooperation with the servo-mechanism maintains the driving speed at or near a predetermined value by continuously changing the angular position of the gas lever.

Figure 2:
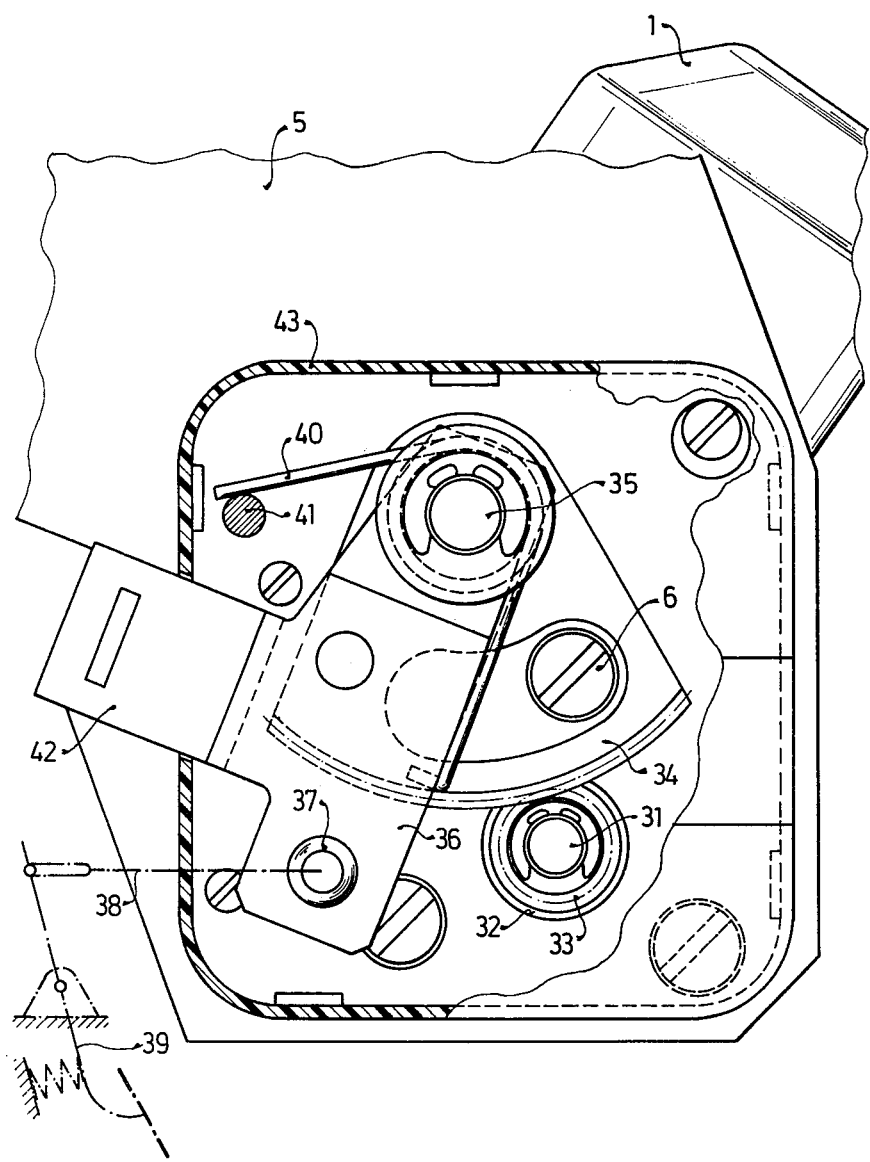
FIG. 2 is a cut-away front view of the device of FIG. 1.

Referring now to FIG. 1, the setting device includes an electromotor 1 having a worm 2 coaxially arranged on its motor shaft. In the embodiment in FIG. 2 the worm 2 is positioned at a sharp angle relative to the longitudinal axis of the motor. The worm 2 projects into housing 3 of an electromagnetic coupling 4. The electro-motor 1 is affixed to the housing 3 in a conventional manner for example by screws.

The casing 3 itself is attached by means of screws 6 to a support plate 5. The worm 2 combingly meshes with a worm gear 7. Here, the worm 2 forms the input side driving element, while the worm gear 7 serves as an output side driving element of a first transmission drive. In the illustrated exemplary embodiment, the worm gear 7 is made of a plastic material and is attached to a disk-shaped magnet armature 8. These worm gear 7 and magnet armature 8 form at the same time an input side coupling element of an electro-magnetic coupling 4 of this setting arrangement. Via this electro-magnetic coupling 4, the driving means 2, 7 and 8 are connectable to an output shaft 9 of the first drive. Upon the output shaft 9, the input side coupling element 7,8 is lodged shiftably. The output side coupling element is fixed to the output shaft 9 and is configured as a flux conducting annulus 10, in which annulus there is housed a magnet coil 12 disposed on a spool carrier 11.

The worm gear 7 is provided at its face converted to the slide guide annulus 10 with a toothing 13. The latter may be brought in engagement with a corresponding toothing 14 provided on the oppositely located facing side of the slide annulus 10. Between both the coupling elements, namely the worm gear 7 and the slide guide annulus 10, a shaft springing disk 15 is arranged outside the toothings 13 and 14. This spring disk biases both said coupling elements 7 and 10 from one another.

The casing 3 surrounding the driving members 2 and 7 and the coupling 4 is closed by a lid 16 made of an insulating material.

From this lid 16 facing side of the slide guide annulus 10, springing contacts 17 and 18 of the magnet coil 12 are led. The same are abutted against slide tracks 19 and 20 located on a flange 21 formed perpendicularly to the longitudinal axis of the coupling 4 upon the lid 16. These slide tracks 19 and 20 possess connectors 22 projecting from the lid 16 serving for current supply to the magnet coil 12.

On the lid 16, coaxially with the output shaft 9, a potentiometer 23 is affixed. This potentiometer 23 comprises a coupling axle having a terminal cut-in 24 of a rectangular cross-section. The slide guide annulus 10 has attached thereto an entraining disk 25 by means of fixing screws 26, so that the entraining disk 25 is shiftable perpendicularly to the longitudinal axis of the output shaft 9 and perpendicularly to the longitudinal sides of the slot 27 provided in the entraining disk 25. The slot 27 has adjusted its breadth to the transverse sides of the rectangular terminal cut-in 24. The length of this slot 27 is greater than the longitudinal extension of the rectangular cross-section of the terminal cut-in 24. In this way, the entraining disk 25 serves as an axial coupling part compensating for any registering fault between the potentiometer 23 and the coupling elements 9 and 10, thus being formed thereby, together with the terminal cut-in 24 an axial coupling between the electro-magnetic coupling members 9 and 10 and the potentionmeter 23.

The output shaft 9 of the first drive 2 and 7 and of the coupling 4 is rotarily journalled in sliding bearings 28 and 29 that are installed within a casing bore 30. The terminal section 31 of the output shaft 9 projects from this casing bore 30 and through an opening 32 in the supporting plate 5.

On the terminal section 31 of the output shaft 9, a pinion 33 is fixed. This pinion 33 is engaged with a sprocketed segment of a rocking arm 34. This rocking arm 34 is swingably supported by a bolt 35 attached to the supporting plate 5 and is firmly secured to a setting lever 36, so that the pinion 33 and the rocking arm 34 form a second transmission drive. Upon the free end of the setting lever 36, a guide button 37 is established serving as link to the gas lever 39 of a combustion engine. A resetting spring 40 surrounds the bolt 35. The same is abutted at the one of its terminals on an arresting stud 41 arranged on the supporting plate 5 and is hooked at the other terminal thereof on the setting lever 36. This resetting spring 40 is prestressed and biases the setting lever 36 to a stop 42, affixed to the supporting plate 5. In this position, the setting arrangement takes the zero-position. A covering cap 43 is associated to the supporting plate 5. The same surrounds the parts of the second drive. Only the guide button 37 projects outwards through an orifice 44 toward the region of the connecting member 38.

Now, when the above mentioned and here not detailedly shown regulator or servo-mechanism of the driving speed feeds a signal exciting the magnet coil 12, the magnet armature 8, together with the worm gear 7, is attracted to the annulus 10 against the force exerted by the shaft spring disk 15. The toothings 13 and 14 arrive so in engagement. The worm gear 8 and the annulus 10 become in effect firmly tied to each other. The electrical motor 1 now rotates the worm 2, the worm gear 8, the annulus 10 and the output shaft 9, together with the pinion 33. This pinion 33, being so actuated, sways the rocking arm 34 by a certain range, so that the gas lever 39 is correspondingly moved by the transmission parts 36, 37 and 38. This results in an alteration in the driving fuel to the combustion engine of the motor car, which has the final result that the driving speed of the motor car gets changed. Upon reaching the standard pre-fixed value of the driving speed, the voltage changing the magnet coil 12 becomes switched-off. This interrupts the attractive force affecting the magnet armature 8 and this magnet armature 8 is again shifted back by the shaft spring disk 15 to its starting position shown in FIG. 1: Now, the electro-magnetic coupling 4 is again detached. Then, the electrical motor 1 also becomes switched-off.

The potentionmeter 23 serves for reporting on the position of the output shaft 9 and therethrough also on the position of the setting lever 36 and of the coupling link 38 of the reset gas lever 39.

The driving voltage for the magnet coil 12 also can be switched-off in the way that the driver pushes a switching button or actuates the coupling pedal. Also in this case, the electro-magnetic coupling 4 is decoupled, so that the resetting spring 40 moves back the transmission parts 36 and 38 to their zero-position and the gas lever 39 becomes correspondingly reset by action of a spring.

The electrical motor 1 is reversible so that the set-up prefixed standard value of the driving speed is influenced by the actual values of the driving speed being under or above said standard pre-fixed value.

I claim:

1. An electrically controllable setting device for use in connection with a servo-mechanism generating a control signal, comprising, in combination: an electromotor energized by said signal; a supporting member; a shaft arranged on said supporting member for rotary movement; an electromagnetic coupling having a disc-shaped armature supported on said shaft for rotary and axial movements and an electromagnetic member fixedly connected to said shaft and engageable with said armature upon actuation by said control signal; a first reduction gear for transmitting the rotary movement of said electromotor to said armature; a rocking arm pivotably supported on said support; means for urging said rocking arm to a rest position; a second reduction gear coupled between said rocking arm and said shaft to angularly displace said rocking arm from its rest position to a controlling position; and angle-to-signal converting means coupled to said shaft to transmit an actual angular value information to said servo-mechanism.

2. A device as defined in claim 1, wherein an end of said shaft remote from said coupling projects through an opening in said support, and said second reduction gear being coupled to the projecting end of said shaft.

3. A device as defined in claim 1, wherein said rocking arm supports a segmental rack forming a part of said second reduction gear, said support supporting a return spring urging said rocking arm with said segmental rack into the rest position.

4. A device as defined in claim 1, wherein the facing surfaces of said disc-shaped armature and said electromagnetic member of said electromagnetic coupling are provided respectively with toothing arranged for engagement with each other.

5. A device as defined in claim 1, wherein the electromagnetic member of the electromagnetic coupling supports coils of an electromagnet.

6. A device as defined in claim 1, wherein said coverting means is a potentiometer adjustably coupled to said shaft.

7. A device as defined in claim 6, wherein said potentiometer is coupled to said shaft by means of a coupling member, said coupling member including means for correcting misalignment between said shaft and said potentiometer.

8. A device as defined in claim 1, wherein said first reduction gear and said electromagnetic coupling are arranged in a housing supported on said supporting member.

9. A device as defined in claim 8, wherein said housing includes a cover of a synthetic material, said potentiometer being arranged within said cover.

10. A device as defined in claim 3, wherein said second reduction gear is enclosed in a second housing defining an opening for the link of the rocking arm to a member to be controlled.

* * * * *